(12) United States Patent
Hiscock et al.

(10) Patent No.: US 6,426,029 B1
(45) Date of Patent: Jul. 30, 2002

(54) LAMINATION BETWEEN PLASTIC RESINS AND CEMENT

(76) Inventors: Donald R. Hiscock, P.O. Box 654, Paradise, Nfld. (CA), A1L 1C4; A. Douglas Newbury, 38 Warren Pl., St. John's Nfld. (CA), A1A 2A1

( * ) Notice: Subject to any disclaimer, the term of this patent is extended or adjusted under 35 U.S.C. 154(b) by 0 days.

(21) Appl. No.: 08/540,451

(22) Filed: Oct. 10, 1995

(51) Int. Cl.[7] .................................................. B28B 1/16
(52) U.S. Cl. ...................... 264/255; 264/256; 264/241; 264/257; 264/259; 264/334
(58) Field of Search ................................. 264/255, 256, 264/241, 257, 259, 334

(56) References Cited

U.S. PATENT DOCUMENTS 4,937,033 A * 6/1990 Oshio et al. ................ 264/256

* cited by examiner

Primary Examiner—Rich Weisberger
(74) Attorney, Agent, or Firm—David J. French

(57) ABSTRACT

A shelled structure is composed of a resinous plastic layer that is bonded to a hydraulic cement layer by the presence of preformed wire, silica sand or chopped glass fibers at the interface. Set into the resin layer while it is still tacky the wire, sand or glass particles bond readily to both the resin and cement. A wire reinforcing mesh or matrix within the cement layer improves its strength and stability. Wire stubs set into the resin layer may be used to locate the wire matrix. Bonding is improved when the resin wire is in the form of a corrugated grid with part of the grid embedded in the resinous plastic layer. Bonding is further improved when a wire grid is used as the coupling agent in combination with sand particles or chopped glass. Alternately, these latter components may be used without a wire grid. Panel strength is improved when the embedded portion of the wire is overlaid with fiber reinforced resin.

17 Claims, 4 Drawing Sheets

LAMINATION BETWEEN PLASTIC RESINS AND CEMENT

FIELD OF THE INVENTION

This invention relates to composite structures made from layers of material that will not normally bond readily to each other. More particularly, it relates to a method and resulting structure whereby a polymeric plastic surface layer, formed from a setting resin, will bond more readily to a hydraulic cement-based layer of mortar, concrete or the like.

BACKGROUND OF THE INVENTION

It is, on occasion, desirable to bond to a concrete surface a polymeric plastic finish. An example is the concrete burial vault with plastic liner described in Canadian patent application 2,062,518 by Michael Davidian (laid-open Sept. 14, 1992). In that reference a thermo-setting epoxy resin adhesive with solvent and surfactant is applied to the outer surface of a preformed thermoplastic resin liner. Before the adhesive is fully cured, wet flowable concrete is applied to the adhesive layer. The result is to bond the concrete to the liner. Earlier United States patents addressing similar technology are U.S. Pat. No. 3,439,461 and U.S. Pat. No. 3,787,545.

In another U.S. Pat. No. 3,949,144 to Duff a reinforced concrete construction is formed from alternate, integrally bonded layers of epoxy concrete containing resin and fibre reinforced epoxy resin. The resulting laminate is a thin-walled construction of reduced cost, due to the use of concrete.

According to one variant of the Duff invention a gel coat is spread over a mold, followed by a layer of chopped glass fibres and epoxy resin. To this last layer while still wet is then applied the resin-containing, wet cement mixture. This is followed by alternate layers of reinforced resin and cement to build-up strength. Thus, in the Duff invention, a polymeric resin with glass fibres imbedded therein is bonded to a hydraulic cement layer that, as well, contains a bonding resin.

Thin structures based on the use of polymer-enriched concrete have also been employed using a fine wire matrix for reinforcing. Sold under the trade mark PERMA PLATE, by Ferro-Mesh of Canada Inc. the technology for fabrication of a three dimensional reinforcing mesh is described in Canadian patent No. 1,145,228. Applications of this technology have been directed to providing a finishing layer to concrete structures such as bridge decks and industrial flooring. The PERMA PLATE (™) finish has also been applied over wooden decking, such as on a pier. PERMA PLATE technology is ideally suited to forming thin-shelled structures having the dimensional stability associated with hydraulic cement and concrete. Problems may be encountered, however, in bonding such material to resin finishes that are organically-based. For example, a more or less complete curing of the concrete at the interface between the resin layer and the concrete layer may be required for maximum bond strength. In an actual production scenario, this delay could amount to a week or longer, and would be unacceptable, particularly if the parts being produced were fairly large and had to be moved for further processing or assembly.

This invention is directed to an improved means for bonding a hydraulic cement-based material to a polymeric plastic surface. It further has as an objective the production of thin walled structures having a high quality resin-based finish on at least one surface, and the dimensional stability of concrete.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one broad aspect of the invention, a thin walled structure is formed by:

(1) laying a resinous, polymeric coat over a mold, such coat being preferably supported by reinforcing fibres imbedded in resin;

(2) distributing a mechanical coupling means, preferably a preformed wire grid or optionally silica sand, chopped glass or mineral fibres, or a combination thereof over the surface of the resin while such resin is soft enough to bind to and retain such coupling means across its surface without absorbing such coupling means fully within the resin so that parts of the mechanical coupling means remain partially exposed;

(3) allowing the resin to set to form an interface surface; and (4) applying a hydraulic cement based layer over the surface of the resin to bond with the exposed parts of the mechanical coupling means.

The coupling means is in all cases made of a solid material compatible with bonding to both the resinous coat and to a hydraulic cement mixture. By this method a composite is produced having alternate resin and cement layers with the coupling agent present, and providing bonding, at the interface of the two layers.

Preferably, the hydraulic cement based layer is polymer-modified so as to be polymer reinforced or bonded and after "may be" insert further; and may be further reinforced by reinforcing planar wire mesh or a three dimensional matrix imbedded therein. Where a wire grid coupling means is employed, such coupling means may be attached to the reinforcing wire mesh or matrix to improve bonding of the cement layer to the resin coat.

As a further variant, the wire grid coupling means may be pre-formed to facilitate such attachment. Thus, a field of protruding wire stubs on a base may be bonded in place by the resin to provide means to locate the reinforcing wire mesh prior to the application of the hydraulic cement, and to further improve bonding between the resin and cement layers. Alternately or simultaneously, the wire grid coupling means may be in the form of a planar grid with raised or corrugated portions intended to protrude above the resin. Such raised or corrugated grid may be further anchored within the resinous coat by applying and imbedding fibre reinforcement above the portion of the coupling means imbedded in the resin.

As a further variant, part of the reinforcing planar wire mesh or matrix of the cement-based layer may be embedded in the layer of wet resin laid over the interface surface before the hydraulic cement based layer has been applied, thereby serving as the coupling means and providing a bond directly between the resinous layer and the hydraulic cement based layer.

Preferably, the resin coat has an outer gel-coat layer to provide an external, molded outer surface with a high-quality finish the mold surface, as well as inner, fibre reinforcement.

As a further variant, silica sand and/or chopped, silica-based or mineral-based fibres are partially imbedded in the resinous polymeric coat as the coupling means and provide bonding between the resin and cement layers.

Where silica sand or other particulate coupling means is used alone to bond the resin and cement layers the cement layer should allowed to cure thoroughly before the part is moved or disturbed as premature handling could destroy the bond. With wire grid as coupling means the part may be carefully moved much sooner. Maximum bonding effect is achieved when the wire grid and particulate matter coupling means are used together. Maximum panel strength is achieved when the cement layer is reinforced with a wire matrix or two layers of flat wire mesh.

By this method, a thin walled structure of substantial size, such as a projection screen or a hollow shelter, can be formed, the gel coat providing a smooth finish. Because of the use of the hydraulic cement to provide body and support, such thin-walled structures exhibit improved dimensional stability under variable temperature conditions.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
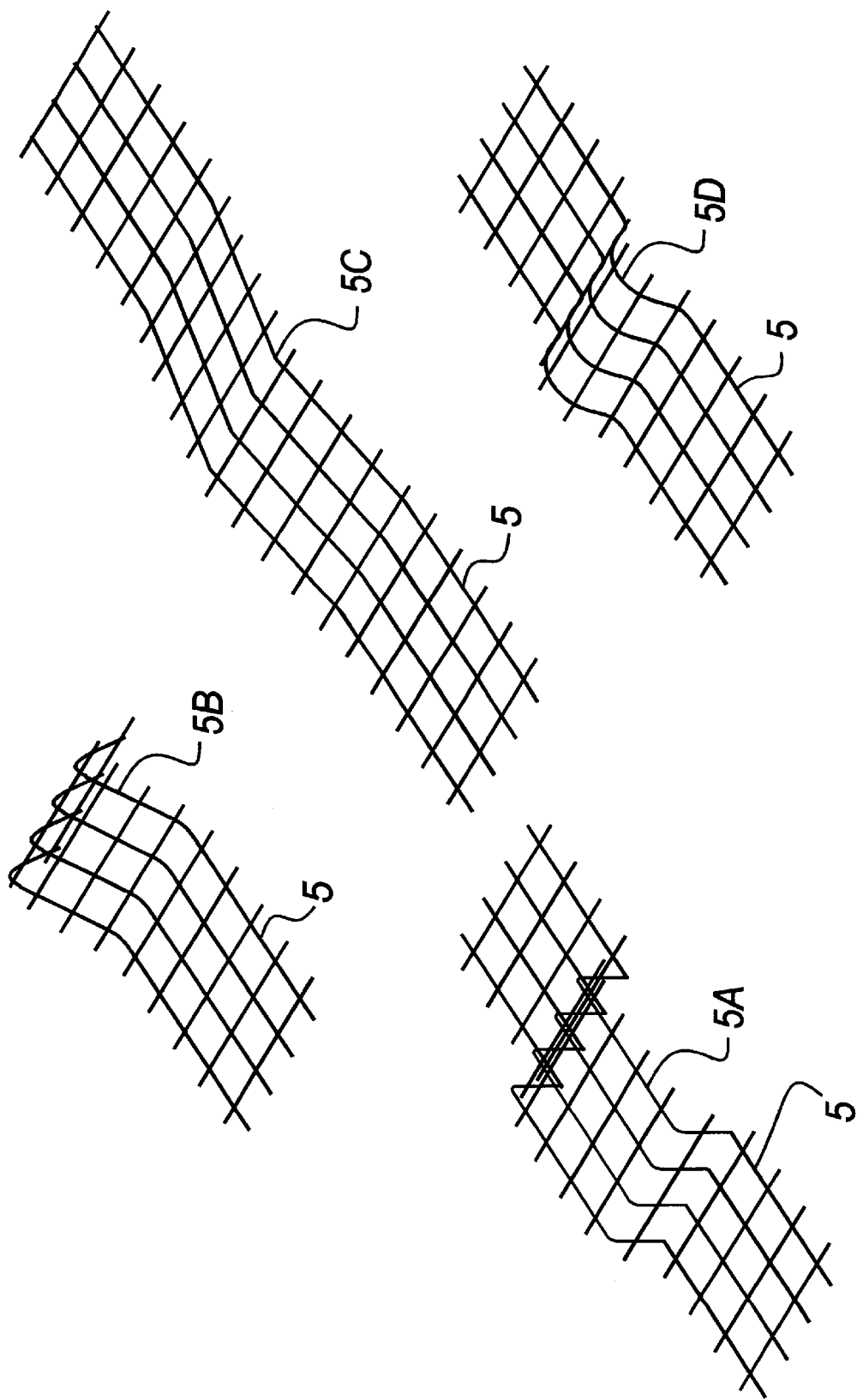
FIG. 1 illustrates configurations of wire grid coupling means, bent so they may be partly embedded in the resin layer and partly in the hydraulic cement-based layer.

In FIG. 1 a gel coat 1 has been laid over the surface of a mold 2. Bonded to the gel coat 1 in the normal way is a resinous coating layer 4 of resin-based plastic with one or more layers of fibreglass reinforcing 3 contained therein.

Figure 2:
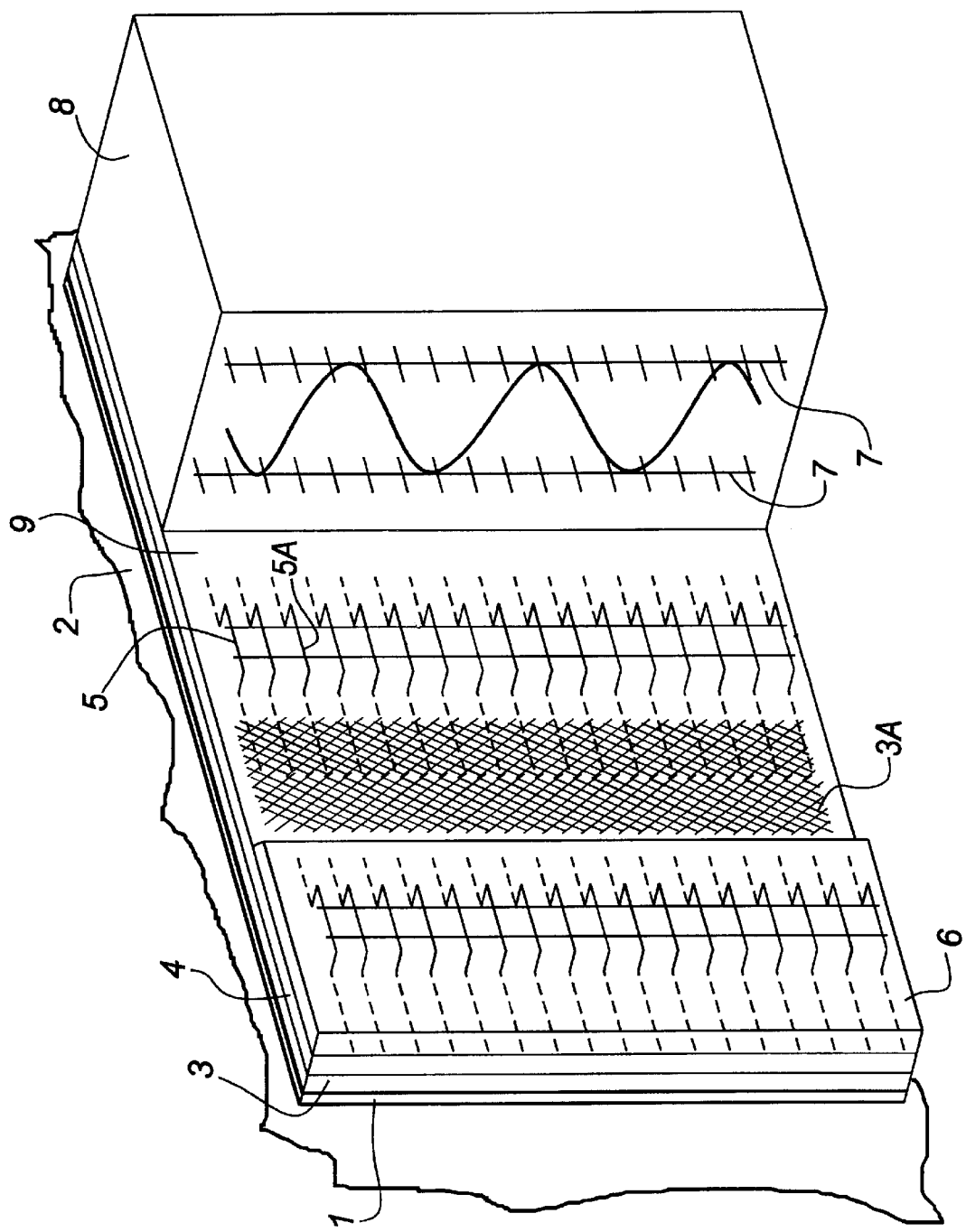
FIG. 2 illustrates a wall or layer construction using a wire grid mechanical coupling means in corrugated form, partially embedded in the resin layer and partially in a cement layer. The lower portion of the wire grid coupling means has been additionally secured to the resin layer by fibre reinforced resin placed over resin embedded portions of the coupling means.

The resin-based plastic layer 3 terminates at a surface 9 that is formed on the side opposite the gel coat 1. While this surface is still tacky, or after placing additional wet resin, a pre-formed wire mesh grid 5, as further depicted in FIG. 2, is pressed into the surface of the resin layer 4 and held there until the resin has set. The wire grid 5 of FIG. 2 is provided with regular elevated portions 5a, 5b, 5c, 5d which are intended to protrude from the resin layer 4. Typical dimensions would be up to two inches wide by up to six inches long with a height of one-eight to one-half inch. Much larger wire grids may be used. These elevated portions may occur regularly, undulating in a corrugated-like manner. Their role is to serve as a coupling means to bond to the hydraulic cement layer 8 which is to follow. The wire mesh grid 5 also serves to support and provide attachment means for the cement layer reinforcing mesh or matrix 7. (Wire mesh may be planar; a wire matrix is three dimensional.) In FIG. 1, the hydraulic cement layer may be reinforced with a three dimensional wire matrix which is bonded to the resin layer through its engagement with the embedded wire grid coupling means.

For greater panel strength, additional fibre-reinforced resin 6 may be placed over the embedded wire grid 5 coupling agent; or reinforcing fibre 3A may be pressed into the resin layer 4.

When the resin has set a reinforcing wire mesh or matrix 7 is located atop the embedded wire grid 5 coupling means and attached thereto. A hydraulic cement-based mortar mix is then placed over the resin surface 9, embedding both the reinforcing matrix 7 and the exposed portions of the wire mesh coupling means 5, to form the cement layer 8. Suitable dimensions for the resin layer 4 and cement layer 8 are one eighth ($\frac{1}{8}$) of an inch and seven eighths ($\frac{7}{8}$) of an inch respectively.

Figure 3:
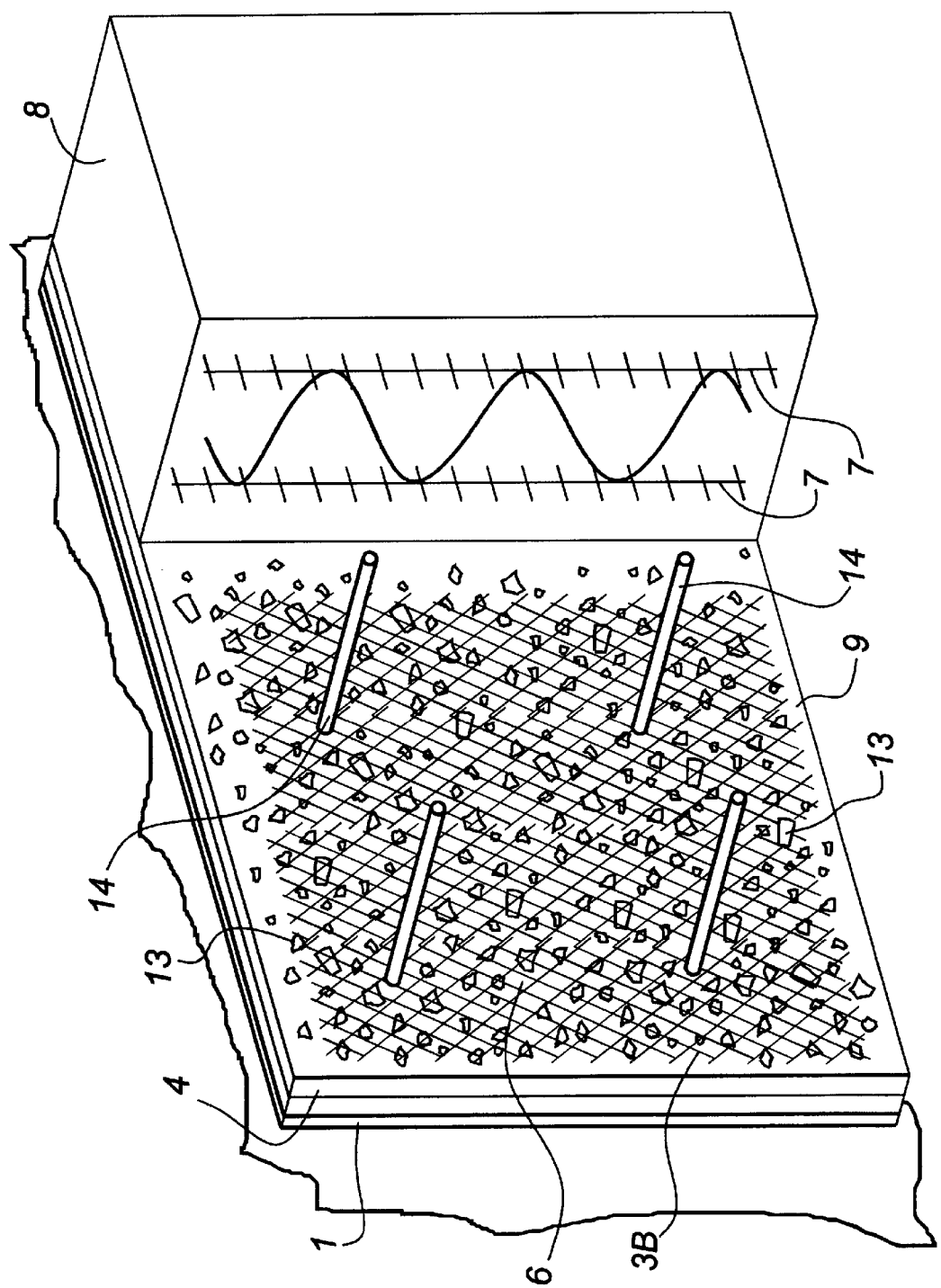
FIG. 3 illustrates a construction using silica sands as the coupling means. Also illustrated is a wire anchor with its base secured to the resin layer by resin impregnated fibreglass cloth or roving which is placed over or around the stub of the anchor. The anchor serves to position the reinforcing for the hydraulic cement layer which rests on the embedded sand particles.

In FIG. 3 silica sand 13 is used one optional part of as the coupling means. Typically, the silica sand may be ¼ inch in diameter. While this surface 9 is still tacky, but stiff enough to provide support at its surface, silica sand 10 is broadcast over it to serve as a further coupling means for the hydraulic cement which is to follow. Approximately half the depth of the particles of sand are embedded in the resin. Such sand 3 works well where time is not a constraint or where the part may be moved without risk of disturbing the interface 9 between the resin and cement layers 4, 8 until the cement layer 8 is fully cured.

While fine and coarser silica sand 13 has been found to work well in this application, any finely divided particulate material that bonds both to the resin surface 9 and to the hydraulic cement 8 may be employed. This includes finely chopped glass or mineral fibres which may be used alone or in addition to sand 13. The coupling means should in all cases sit on the surface 9 partially immersed in the resin 4 to which it is bonded, leaving an exposed upper portion protruding for bonding to the cement layer 8. Therefore such granules or fibres 13 should not be submerged totally into the resin layer 4.

Optionally, wire anchors or, as shown in FIG. 3, an array of protruding wire stubs 14 to serve as anchors 14 may be partially embedded in the resin layer 4. Over these stubs 14 may be applied fibreglass cloth/roving 3B as a flexible support or carrier layer which may be pierced by the wire stubs 14, or be placed intermediate the protruding portions of any such coupling means 5. The anchors 14 are laid in wet resin which is allowed to set. The protruding wire stubs 14 may then be bent over portions of a reinforcing wire matrix 7 provided for the hydraulic cement layer 8 and thereby serve to hold such reinforcing 7 in place until the cement layer 8 mix has been placed and set.

Figure 4:
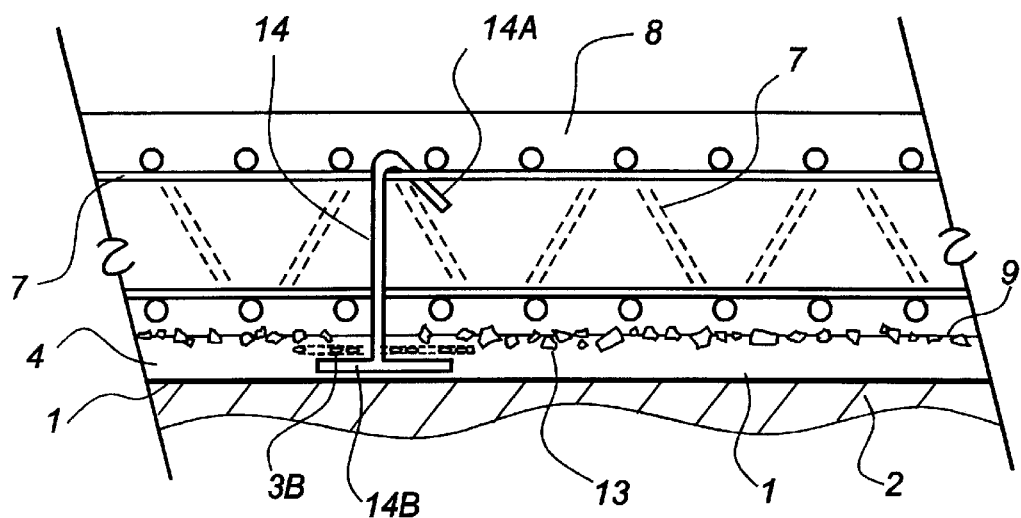
FIG. 4 is a cross-section of the structure of FIG. 3 in which the anchor stub is bent down over the reinforcing to anchor it during placing of the cement.

FIG. 4 illustrates a construction similar to FIG. 3 except that in this variant, wire stub coupling means 14 has a foot 14B that is bent to extend on both sides of the stub 14 with fibreglass 3B overlying such feet 14B.

In FIG. 4, the hook ends 14A of stubs 14, which may be partially pre-bent, are shown as closed over parts of the wire matrix 7 to secure it in place. Once the reinforcing wire mesh 7 is properly located, a filling of hydraulic cement preferably in the form of polymer-modified concrete, may be applied to form the cement layer 8. If suitably stiff when applied, this cement layer 8 may be laid-on over near vertically oriented surfaces permitting molds with substantial curvature to be employed.

In FIGS. 3 and 4 the anchor 14 is shown singly, with a foot 14B. As an alternative, a wire substrate having a field of protruding wire stubs 14 to serve as anchors may be prepared to which may be applied fibreglass roving 3B with the stubs 14 protruding through the roving 3B. By the use of fine, soft wire in the substrate as a carrier layer, the combined substrate and fiber reinforcing 3B can be sufficiently flexible to be laid over a curved surface on a mold. The substrate also allows for the bulk placement of stubs 14 which serve as anchors.

Figure 5:
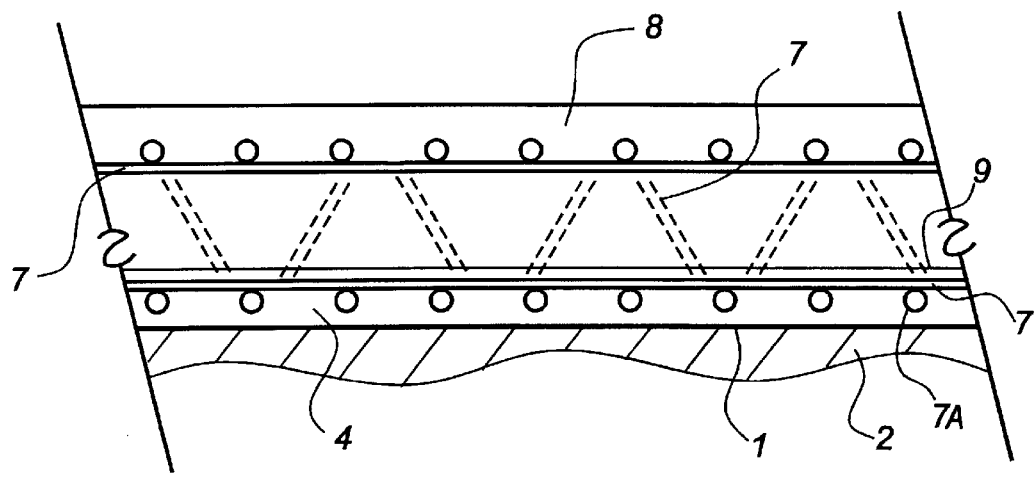
FIG. 5 illustrates a construction wherein the bottom grid of a wire mesh matrix 7 serves as the coupling means, being partially embedded in the resin layer 4.

As a further alternative where such flexibility is not required, in FIG. 5 the bottom portion 7A of the reinforcing layer of mesh in the matrix 7 is partially embedded in the resin layer 4 and acts as the coupling means in the bonding to that layer.

While it is preferred to use a preformed, three dimensional reinforcing matrix of the PERMA PLATE type described above for the cement reinforcing wire mesh 7 the same final result can be obtained by using any planar or dual layer cement reinforcing wire matrix 7.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed as follows:

1. A method of constructing a thin walled structure comprising the steps of:
   (1) laying a resinous, polymeric coating over a mold having a mold surface;
   (2) distributing over the resinous coating a mechanical coupling means, compatible to effect a bond both with the resinous coating and with hydraulic cement, such mechanical coupling means being applied over the surface of the resinous coating while such coating is soft enough to bind to and retain such mechanical coupling means across its surface without absorbing such mechanical coupling means fully within the coating so that parts of the mechanical coupling means remain exposed;
   (3) allowing the resinous polymeric coating to set to form an interface surface; and
   (4) applying a hydraulic cement based layer over the set interface surface of the resinous coating to bond with the exposed parts of the mechanical coupling means.

2. The method of claim 1 wherein said mechanical coupling means comprises a wire grid that has a portion which is partially embedded in the resinous coating.

3. The method of claim 2 wherein the wire grid is bent up from the resin-embedded portion of the grid to form corrugations that protrude above the resin.

4. The method of claims 1, 2 or 3 wherein the hydraulic cement based layer is strengthened by a reinforcing wire mesh or matrix embedded therein that is attached to the mechanical coupling means before application of hydraulic cement over the interface surface.

5. A method as in claim 1, comprising placing a portion of a concrete reinforcing wire mesh or matrix within the resinous coating before it has set, exposing the remaining portion of the mesh or matrix for embedding in the hydraulic cement based layer when such layer is subsequently applied to serve as both the mechanical coupling means and as reinforcement for the concrete based layer.

6. The method of claim 1 wherein the mechanical coupling means comprises a field of protruding wire stubs having embedded portions bonded in place by the resinous coating after the resinous polymeric coating has set, together with the further step of connecting a reinforcing wire mesh or matrix to said wire stubs to position said wire mesh or matrix prior to the application of the hydraulic cement based layer and to further improve bonding between the resin and cement layers.

7. A method as in claim 6 wherein the protruding wire stubs are attached to a carrier layer before having their embedded portions applied to the surface of the resinous coating.

8. A method as in claim 6 comprising placing reinforcing fibres to overlie the to-be-embedded portions of the wire stubs with said wire stubs positioned to penetrate the reinforcing fibres, followed by embedding said reinforcing fibres and embedded wire portions in the resinous coating.

9. A method as in claims 2 or 3 comprising laying reinforcing fibres within the resinous coating, overlying the resinous-embedded portion of the grid.

10. The method of claim 1 wherein the resinous coating has an outer gel-coat layer laid over the surface of the mold to provide the surface of the structure with a finish that closely conforms with the surface of the mold.

11. A method as in claim 1, 2, 3, 5, 6, 7, 8 or 10 wherein the mechanical coupling means includes bonding material selected from the group consisting of a particulate material, chopped glass or chopped mineral fibres compatible with bonding to the polymeric coating and hydraulic cement based layer and said bonding material is broadcast over the interface surface before it sets to provide at least part of said mechanical coupling Schedule A to Response of Apr. 3, 1998 Ser. No. 08/540,451 means between the resinous polymeric coating and the hydraulic cement based layer.

12. A method as in claim 2 wherein the coupling means comprises a field of protruding wire stubs having embedded portions, including the step of attaching said wire stubs to a carrier layer before their embedded portions are applied to the surface of the resinous coating.

13. A method as in claims 1, 2, 3, 5, 6, 7, 8 or 10 wherein the hydraulic cement is polymer reinforced.

14. A method as claimed in claim 4 wherein the hydraulic cement is polymer reinforced.

15. A method as in claim 9 wherein the hydraulic cement is polymer reinforced.

16. A method as in claim 11 wherein the hydraulic cement is polymer reinforced.

17. A method as in claim 12 wherein the hydraulic cement is polymer reinforced.

* * * * *